June 10, 1930.                F. P. LAMBERT                1,762,635
                              STEAM TABLE PAN
                             Filed Oct. 14, 1929

INVENTOR.
Frank P. Lambert
BY M. C. Frank
ATTORNEY.

Patented June 10, 1930

1,762,635

UNITED STATES PATENT OFFICE

FRANK P. LAMBERT, OF OAKLAND, CALIFORNIA

STEAM-TABLE PAN

Application filed October 14, 1929. Serial No. 399,420.

The invention relates to a serving pan for use at a steam-table.

An object of the invention is to provide an improved steam-table pan having separate compartments for containing foods to be served in association.

Another object of the invention is to provide in a serving-pan structure means for entirely supporting thereon a food-serving tool with its handle in a convenient and extended position for grasping by a server.

A further object of the invention is to provide a pan of the class described which is arranged for nesting with like pans whereby a plurality of the pans may occupy a minimum of space when not in use.

Yet another object is to bring about a new combination and correlation of parts in a pan of the class described whereby marked economies in manufacture will be effected and the use of the pan will be facilitated.

The invention possesses other objects and features of advantage, some of which, with the foregoing, will be set forth or be apparent in the following description of a preferred form of the invention which is illustrated in the accompanying drawings, in which.

Figure 1:
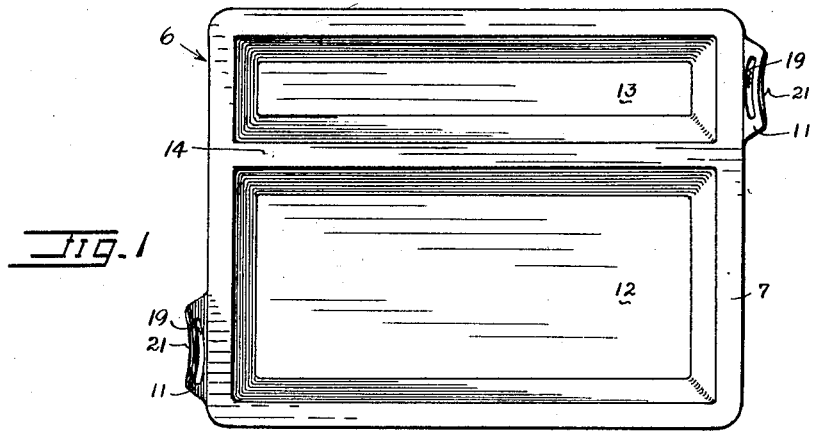
Figure 1 is a top plan view of a pan embodying the invention.

In cafeterias and the like where food is viewed by a customer before serving, it is, of course, highly desirable that the appearance of the food and its surroundings be of the best. Furthermore, certain hot foods are frequently served in combination with other foods, whereby it is desirable that the associated foods be juxtaposed at the serving table. For associating such food combinations as corned beef and cabbage, roast meats and dressings or gravies, pot roast and noodles, etc., for serving from the usual single-compartment steam-table pans, it has heretofore been a general practice to place the different foods of a said combination at opposite ends of the same pan whereby, after a few helpings are served, the foods become more or less mixed to produce an unsavory appearance thereof. The latter difficulty, it is noted, is particularly met with in serving foods which must be kept hot at a steam-table or the like wherein each pan must be retained in a fixed place on the table, and it is to an improved serving pan for steam-table use under the above and other conditions that the present invention particularly relates.

Referring to the drawings, the features of the present invention are incorporated in the structure of a pan 6 of rectangular outline and having a rim 7 extending completely around its edge for engaging a steam table top 8 to support the pan in depending position through an opening 9 in the top. As shown, the rim 7 is flat and is arranged to so engage the top 8 as to prevent the escape of steam or vapors through the joint thereat. To facilitate the handling of the pan in placing it in, or removing it from, the table top, the pan is provided with upwardly extending handles 11 at opposite ends thereof.

It will now be noted that the pan 6 is preferably formed as a one-piece structure having the parts thereof of uniform thickness whereby it may be stamped from sheet metal, and will be of minimum weight for its size. Aluminum is a preferred material for the pan, it being noted that the pan might, if preferred, be produced as a one-piece casting.

Figures 2, 3:
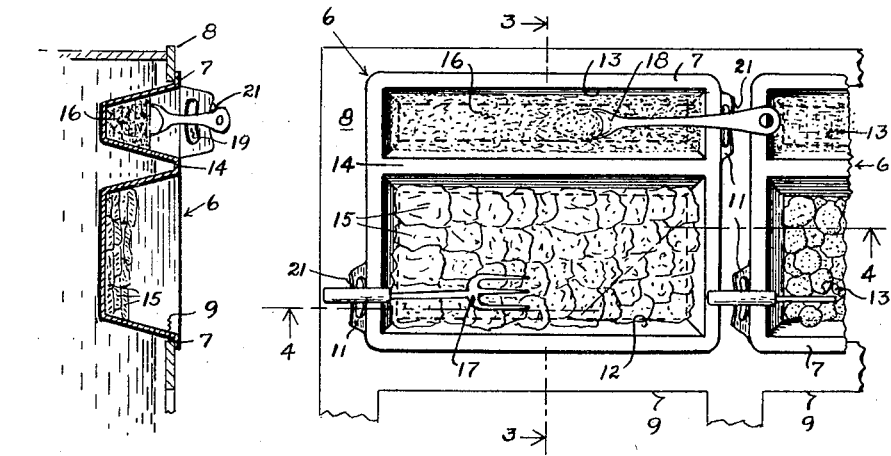
Figure 2 is a reduced and fragmentary plan view showing pans embodying the invention mounted on a steam-table top and containing both food and food-serving tools.
Figures 3 and 4 are sectional elevations taken respectively at 3—3 and 4—4 in Figure 2.
Figure 4:
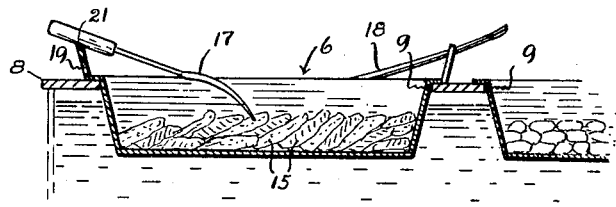

To adapt the pan for the desired separation of associated foods therein, the pan is preferably shaped to provide compartments or receptacles 12 and 13 extending longitudinally of the pan, a partition 14 in the general form of an inverted U dividing the pan to provide the aforesaid compartments therein. Generally, the relative quantities of foods to be served together from the two compartments will differ, and it is therefore preferred to form the compartments to have different capacities. By way of an example and as indicated in Figures 2, 3 and 4, meat cuts 15 may be disposed in the larger compartment 12 while a liquid gravy 16, or other garnish, is disposed in the compartment 13. In this manner, the two associated foods are provided in the proper serving proportion therefor and a most efficient use of the available space is provided for.

In the present embodiment, the handles 11 are also utilized for at least a partial support of serving tools such as the fork 17 and spoon 18 shown in Figures 2 to 4 inclusive. Preferably, and as shown, the handles 11 are generally flat and are provided with hand holes 19. Concave notches 21 are provided in the top edges of the handles for supportedly retaining the handle ends of the serving tools in raised position, while the food-engaging portions of the tools rest in a pan compartment. As particularly shown, the handles 11 are adjacent diagonally opposite pan corners whereby they are opposite the different pan compartments and the food-engaging serving-tool portions rest in the food with which they are used, both of the tools extending longitudinally of the pan. In this manner, the serving-tool handles are arranged to be kept free from the food and are at the same time disposed for ready grasping by a server of the food. It it noted that the present arrangement of the handles also tends to effect an equalized distribution of weight on opposite sides of the diagonal line of support provided by the handles, particularly when the food loads in the different compartments produce an unequal distribution of food weight in the pan. A further advantage in the arrangement lies in the fact that the serving tools in adjacent pans may not contact or interfere, the relation being particularly brought out in Figures 2 and 4.

Figure 5:
Figure 5 is an elevation showing a plurality of the pans assembled in nested relation.

Preferably, and as shown, the compartment cavities are smallest at their bottoms and are of trapezoidal cross-section whereby the compartment sides are oblique to the general plane of the pan. The handles 11 are also oblique to the said pan plane and are generally parallel to the compartment sides nearest thereto. In this manner, a plurality of the pans is arranged for nesting in a minimum space when the pans are not in use; this feature is brought out in Figure 5. In this manner, the trays may be loaded while in a stack thereof and a minimum of kitchen space is required. The aforesaid structural feature also eliminates acute and right-angled corners from the pans whereby the pans may be kept clean and sanitary with particular readiness.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. A steam-table pan of one-piece structure having a continuous supporting rim therearound provided at its outer edge with a plurality of upwardly directed handle extensions, said pan having sloping sides and said extensions being parallel to the adjacent pan sides whereby the pan is arranged for nested engagement with like pans.

2. In a steam-table pan of one-piece structure formed to provide a plurality of receptacles, a rim portion extending laterally from and around the pan top as a supporting means for the pan, and a handle extending upwardly from the outer edge of said rim portion and provided with a notch for the retaining support of the handle of a food-serving tool having its food-engaging portion resting in a said receptacle of the pan.

3. In a steam-table pan formed to provide a pair of food compartments for the respective reception of a food and a garnish for the food, a pan supporting rim encircling said compartments and integral with the pan structure, and a handle extending rigidly from said rim and having a notch at the upper side thereof for the retaining support of the handle of a food-serving tool having its food-engaging portion resting in a said compartment.

4. A steam-table pan of one-piece structure formed to provide a pair of parallelly related receptacles extending longitudinally of the pan, a rim portion extending laterally from and around the pan top as a supporting means for the pan, and upwardly directed extensions of said rim portion opposite ends of the different compartments providing rests for the handles of food-serving tools engaged in the respective compartments, said extensions being diagonally related with respect to the pan and arranged for joint use in carrying the pan.

In testimony whereof, I affix my signature.

FRANK P. LAMBERT.